US012692003B2

(12) United States Patent
Ligonniere et al.

(10) Patent No.: US 12,692,003 B2
(45) Date of Patent: Jul. 28, 2026

(54) PARTITION FOR AIRCRAFT SEAT ARRANGEMENT WITH SLIDING DOOR AND ASSOCIATED AIRCRAFT SEAT ARRANGEMENT

(71) Applicant: Safran Seats, Plaisir (FR)

(72) Inventors: Laurent Ligonniere, Moissy-Cramayel (FR); Olivier Cazalis, Moissy-Cramayel (FR); Mourad Rajhi, Moissy-Cramayel (FR); José Bernardo De Morais, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 244 days.

(21) Appl. No.: 18/717,041

(22) PCT Filed: Dec. 2, 2022

(86) PCT No.: PCT/FR2022/052234
§ 371 (c)(1),
(2) Date: Jun. 6, 2024

(87) PCT Pub. No.: WO2023/105144
PCT Pub. Date: Jun. 15, 2023

(65) Prior Publication Data
US 2025/0033775 A1 Jan. 30, 2025

(30) Foreign Application Priority Data
Dec. 7, 2021 (FR) ...................................... 2113066

(51) Int. Cl.
B64D 11/06 (2006.01)

(52) U.S. Cl.
CPC ................................. B64D 11/0606 (2014.12)

(58) Field of Classification Search
CPC .................................................. B64D 11/0606
See application file for complete search history.

(56) References Cited

U.S. PATENT DOCUMENTS

| | | | | |
|---|---|---|---|---|
| 9,920,559 B2 * | 3/2018 | Druckman | ............ | E06B 3/4636 |
| 12,043,389 B2 * | 7/2024 | Wills | ...................... | E05C 19/04 |

(Continued)

FOREIGN PATENT DOCUMENTS

| | | | | | |
|---|---|---|---|---|---|
| EP | 2549042 A1 * | 1/2013 | ............. | E05F 5/003 |
| EP | 3633127 B1 * | 8/2021 | ............. | E05D 15/10 |

(Continued)

OTHER PUBLICATIONS

International Patent Application No. PCT/FR2022/052234, International Search Report and Written Opinion, dated Mar. 22, 2023.

*Primary Examiner* — Christopher P Ellis

(74) *Attorney, Agent, or Firm* — Kilpatrick Townsend & Stockton LLP

(57) ABSTRACT

This partition for an aircraft seat arrangement includes a fixed portion and a sliding door movable between an opening position in which the door is stowed into a compartment formed in the fixed portion and a closure position in which the door comes out of the compartment, the partition including a mechanical assist device acting on the door between the opening and closure positions and able to hold the door in both the opening and closure positions, the assist device being adapted to apply a braking force and a pushing force during successive respective phases of the movement of the door between the opening and closure positions.

10 Claims, 3 Drawing Sheets

(56)     References Cited

U.S. PATENT DOCUMENTS

2021/0179254 A1 *  6/2021  Scotford ............... B64C 1/1438
2023/0287720 A1 *  9/2023  Hoang ................ E05D 15/0652
2023/0391441 A1 * 12/2023  Dowty ................... E05B 65/08
2023/0415897 A1 * 12/2023  Dingankar ......... B64D 11/0606

FOREIGN PATENT DOCUMENTS

EP        4624332  A1 * 10/2025  ......... B64D 11/0602
EP        4085003  B1 *  2/2026  ......... B64D 11/0602
FR        1358198  A  *  4/1964  .......... B64C 1/1407
FR        3050717  A1    11/2017
GB        2548901  A  * 10/2017  .......... E06B 3/5072
GB        2596873  A  *  1/2022  .......... B64C 1/1438
GB        2608450  A  *  1/2023  .......... E06B 3/4654
WO    2016164352  A1    10/2016
WO    2020020658  A1     1/2020
WO    2021084479  A1     5/2021

* cited by examiner

PARTITION FOR AIRCRAFT SEAT ARRANGEMENT WITH SLIDING DOOR AND ASSOCIATED AIRCRAFT SEAT ARRANGEMENT

TECHNICAL FIELD

The invention generally relates to cabin arrangements of a vehicle such as an aircraft.

In particular, the invention relates to aircraft cabin arrangements offering the passengers, in particular in the business class, private suites provided with a door leaf, such as a deployable door.

PRIOR ART

In aircraft equipped with such private suites, the door leaf is generally a sliding one and allows closing the partition between the passenger and the aisle of the aircraft, so as to define a private and isolated space for the passenger.

In an aircraft, one of the major concerns is the management of the weight of the on-board cabin arrangements as well as the management of the installation density of the arrangements, while guaranteeing the comfort needs of the passengers and compliance with safety requirements.

Thus, it is necessary to reduce the space occupied by such a partition, in particular widthwise, so as to be able to equip aircraft having a reduced pitch with such a partition with a deployable door.

Currently, the compactness of such partitions does not allow equipping an aircraft wherein the pitch between two successive seats is shorter than forty-four inches.

For example, it is necessary to be able to equip single-aisle aircraft with such a partition.

Hence, the invention aims to provide a partition for a seat arrangement, with a reduced mass, a simple structure and which meets the safety obligations while reducing the risks of failure.

Another aim is to control the movement of the door leaf between its extreme positions.

Hence, an object of the invention is a partition for an aircraft seat arrangement comprising a fixed portion and a sliding door movable between an opening position in which the door is stowed into a compartment formed in the fixed portion and a closure position in which the door comes out of the compartment, the partition comprising a mechanical assist device acting on the door between the opening and closure positions and able to hold the door in both the opening and closure positions, the assist device being adapted to apply a braking force and a pushing force during successive respective phases of the movement of the door between the opening and closure positions. Advantageously, the mechanical assist device can be activated manually.

Preferably, the mechanical assist device comprises a sliding mount supporting the door and a bistable gas cylinder fastened at one end to the fixed portion and at an opposite end to the sliding mount.

Thus, the partition is refined and lightened, the number of parts necessary for the deployment of the door being limited. In addition, the use of a gas cylinder allows controlling the speed of movement of the door and avoiding the use of locks in order to hold the door in the opening and closure positions.

In one embodiment, the sliding mount has a U-like profiled shape and is arranged at a first vertical end of the door facing the fixed portion in the closure position of the partition.

In one embodiment, the partition comprises first and second vertical stops arranged on either side of the door so that the first end of the door bears against the first stop in the opening position and a second end of the opposite door bears against the second stop in the closure position.

Advantageously, the cylinder is fastened to the fixed portion at a mid-point between the closure position and the opening position.

Preferably, the partition comprises a guide rail, the sliding door moving on the guide rail via a pad of the mount mounted on the rail.

Another object of the invention is an aircraft comprising a first seat arrangement comprising a seat and a partition as defined hereinabove.

Advantageously, the partition is arranged so that the door in the closure position isolates the seat from an aisle of the aircraft.

In one embodiment, the partition of the arrangement comprises first and second vertical stops arranged on either side of the door so that a first end of the door facing the fixed portion in the closure position of the partition bears against the first stop in the opening position and a second end of the opposite door bears against the second stop in the closure position, the aircraft comprising a second seat arrangement comprising a partition as defined hereinabove, the second stop of the first arrangement being the first stop of the second arrangement.

BRIEF DESCRIPTION OF THE DRAWINGS

Other aims, features and advantages of the invention will appear upon reading the following description, given only as a non-limiting example, and made with reference to the appended drawings wherein.

DETAILED DISCLOSURE OF AT LEAST ONE EMBODIMENT

Figure 1:
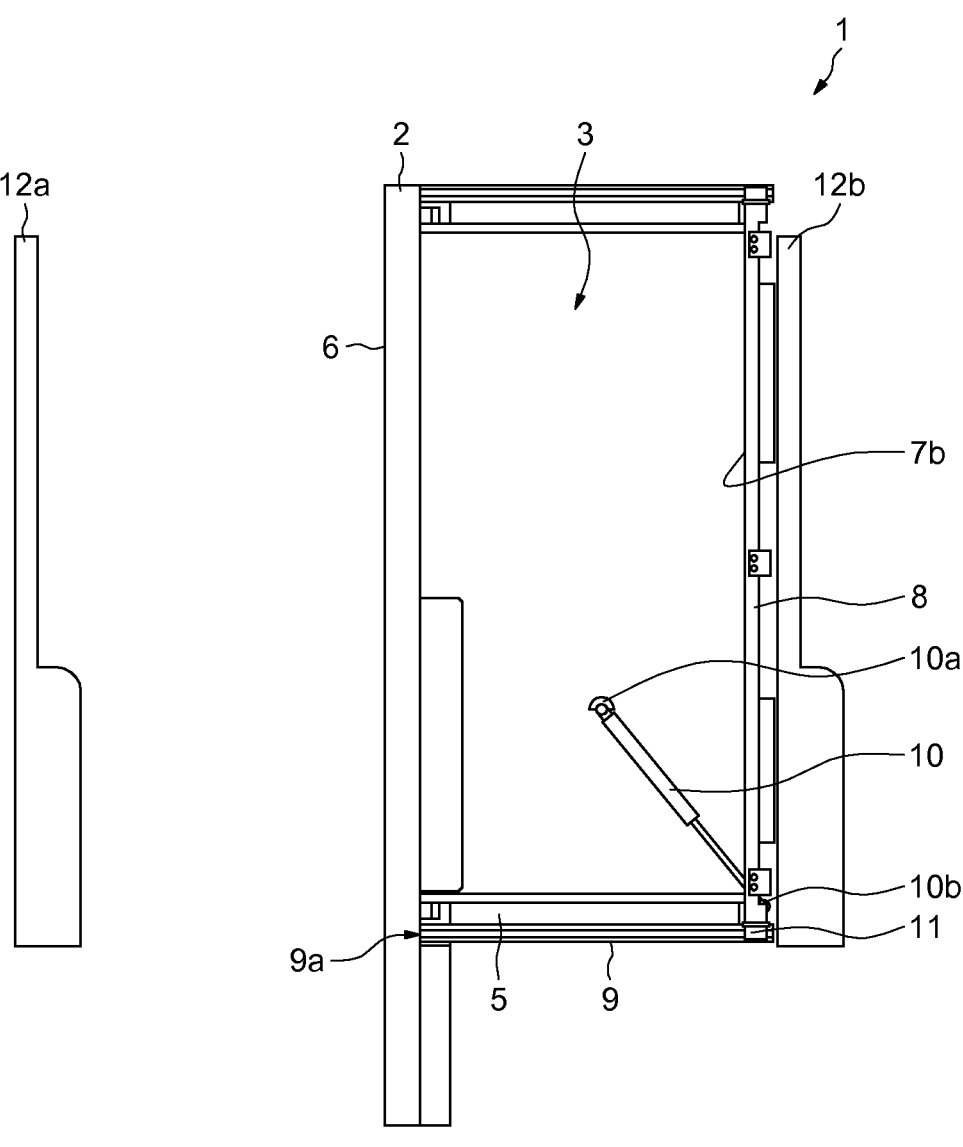
FIG. 1 illustrates a longitudinal section of a partition according to the invention in the opening position.
Figure 2:
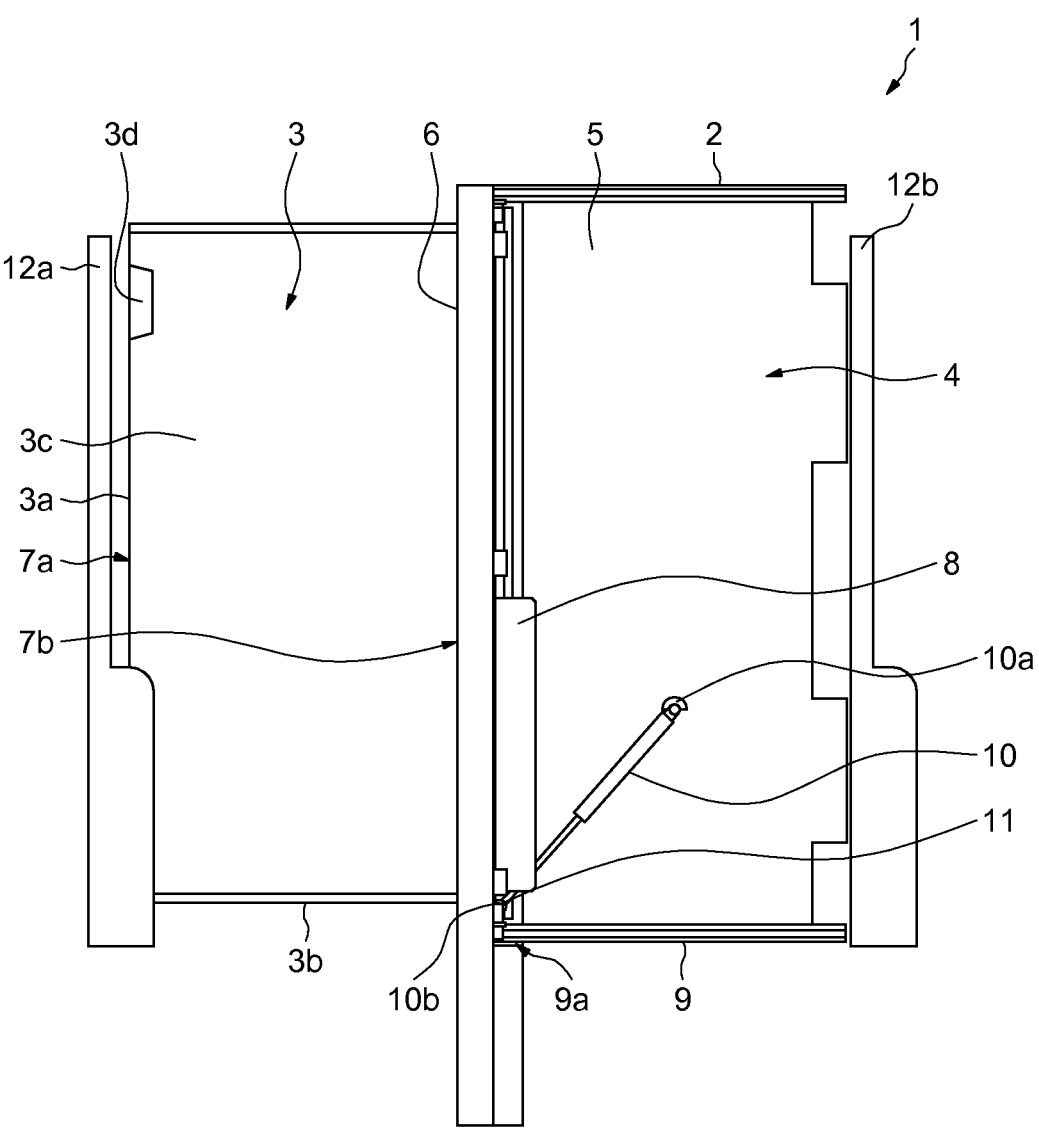
FIG. 2 illustrates a longitudinal section of a partition according to the invention in the closure position.

FIGS. 1 and 2 schematically show a longitudinal section of a partition 1 according to the invention.

The partition 1 is a partition intended to be used especially in a vehicle to allow defining a passenger seat arrangement in a common space. For example, the vehicle may be an aircraft, the seat arrangement being intended to be installed in the business class part of the cabin.

The partition 1 comprises a fixed portion 2 and a sliding door 3 movable between an opening position shown in FIG. 1 in which the door 3 is stowed into a compartment 4 formed in the fixed portion 2 and a closure position shown in FIG. 2 in which the door 3 comes out of the compartment 4.

The fixed portion 2 is shown in FIGS. 1 and 2 in longitudinal section. The fixed portion 2 comprises an internal surface 5 parallel to the sliding door 3. The internal surface 5 may be the internal face of the wall of the fixed portion 2 or a surface fastened to the fixed portion 2 and arranged between the wall of the fixed portion and the plane containing the sliding door 3. In this second case shown in FIGS. 1 and 2, the internal surface 5 comprises a set of circular holes in order, on the one hand, to make savings in the amount of material for manufacturing the surface 5 and, on the other hand, to lighten the surface 5. The internal surface 5 is fixed relative to the fixed portion 2 throughout the movement of the movable door 3.

The fixed portion 2 is hollow as it comprises an internal cavity defining a compartment 4 intended to receive the sliding door 3. In addition, the fixed portion 2 comprises a lateral vertical opening 6 allowing access to the compartment 4.

The sliding door 3 is movable according to a sliding axis parallel to the internal surface 5 and passing through the opening 6. The sliding door 3 comprises a height 3a and a width 3b, the width 3b being parallel to the sliding axis and the height 3a being perpendicular to this sliding axis and parallel to the opening 6.

For example, the sliding door 3 comprises a planar door panel 3c and a handle 3d positioned on one end of the door 7a which is opposite to another end of the door 7b, this other end 7b facing the fixed portion 2 in the closure position shown in FIG. 2.

In the opening position, the sliding door 3 is completely inserted into the compartment 4 and is therefore stowed. In this manner, the sliding door 3 is not an obstacle and the partition comprises an opening enabling the passenger to pass. Conversely, in the closure position, the sliding door 3 is arranged completely outside the compartment 4 and therefore obstructs the opening. Hence, the partition 1 is then closed and the passenger is isolated from the rest of the cabin of the aircraft.

The partition 1 comprises a mechanical device for assisting the movement of the sliding door 3.

The mechanical assist device comprises a sliding mount 8, a guide rail 9, and a bistable mechanical assist means 10.

The sliding mount 8 supports the sliding door 3 and is fixed relative to this door 3.

The guide rail 9 is arranged in the compartment 4, for example at the bottom of the compartment 4 so as to define the sliding axis of the door 3. Hence, the guide rail 9 is positioned so that the sliding door 3 could entirely pass through the opening 6 during movement thereof on the rail 9 between the opening and closure positions. The guide rail 9 extends over a length substantially equal to the width 3b of the door. In addition, the guide rail 9 comprises a first end 9a arranged substantially at the level of the opening 6.

Possibly, the mechanical assist device comprises two guide rails 9, for example arranged respectively at the top and at the bottom of the compartment 4.

The sliding mount 8 comprises a means for sliding on the rail 9 such as a pad 11 mounted on the rail 9. Thus, the sliding mount 8 is able to make the door 3 slide between the opening and closure positions.

Figure 3:
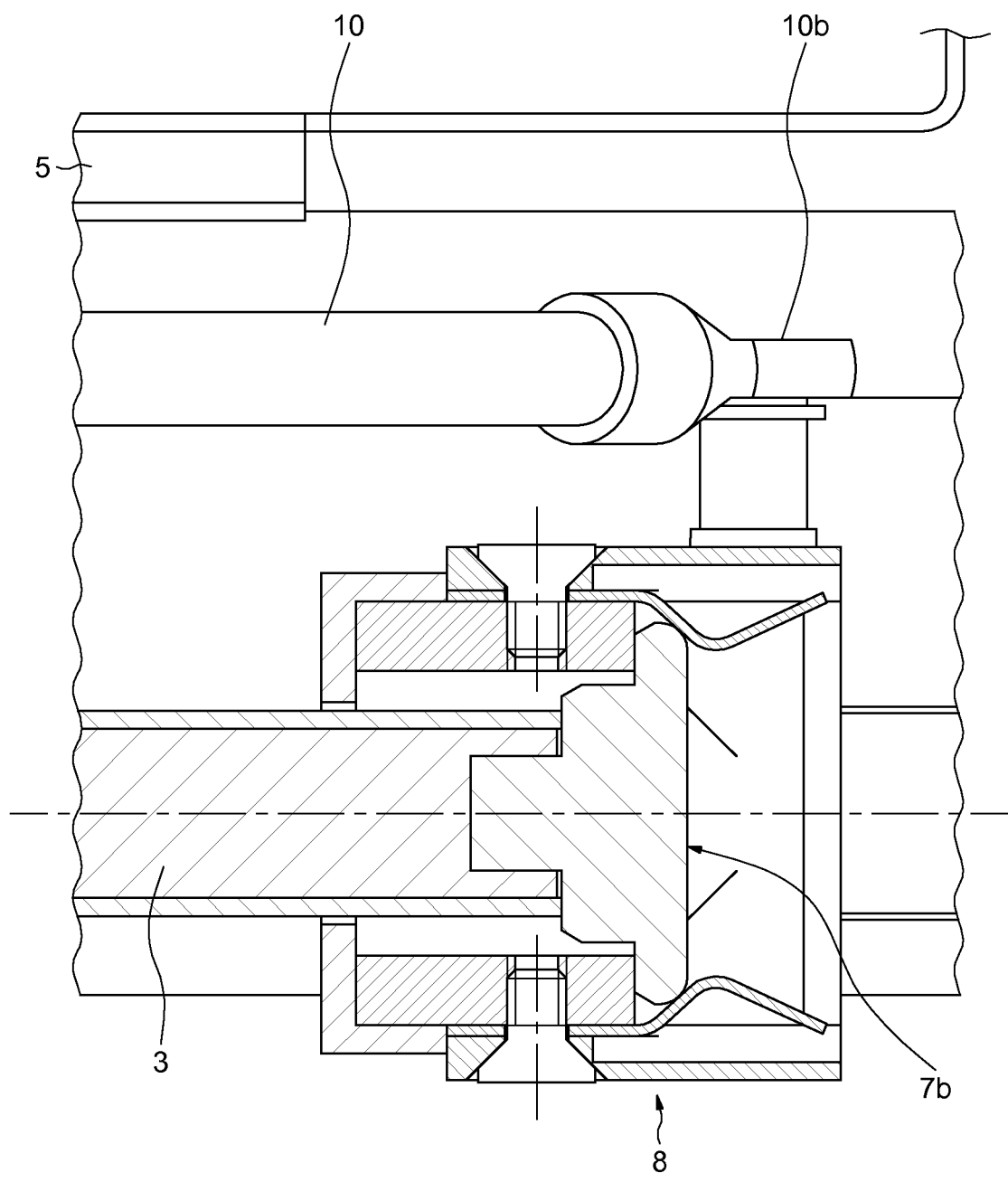
FIG. 3 illustrates a top view in section of the sliding door supported by the mount.

More particularly, the sliding mount 8 of the door 3 has a "U"-like shaped profiled shape and clasps the door 3, as shown in FIG. 3. FIG. 3 illustrates a top view of the door 3 supported by the mount 8.

In one embodiment wherein two guide rails 9 are arranged respectively at the top and at the bottom of the compartment 4, the sliding mount 8 is "O"-like shaped and completely clasps the door 3.

The sliding mount 8 is arranged at the end 7b of the door 3. In this manner, the stroke length of the pad 11 on the rail 9 is maximum so as to make the door 3 completely come out of the compartment 4 in the closure position of the partition 1 and to completely stow it in the opening position.

The mechanical assist means 10 is a bistable gas cylinder. The bistable gas cylinder 10 is fastened at a first end 10a to the fixed portion 2 and at an opposite end 10b to the sliding mount 8. More specifically, the end 10a of the gas cylinder is fastened to the internal surface 5.

The gas cylinder is so-called bistable as it comprises two opposite stability positions respectively corresponding to the opening position and to the closure position. More specifically, the cylinder is fastened at its end 10a to the internal surface 5 of the fixed portion 2 at a mid-point between the position of the end 7b in the closure position and the position of the end 7b in the opening position of the partition 1.

Thus, during sliding of the door 3 through sliding of the mount 8, the end 10a remains fixed and the end 10b slides according to the sliding axis. Hence, the cylinder 10 is pivotably mounted about the axis perpendicular to the internal surface 5 and carrying the end 10a, and comprises a tilt point within its stroke. Before crossing this tilt point, the cylinder 10 brakes the movement of the mount 8 supporting the door 3 and thus tends to resist the movement between the opening and closure positions of the partition 1. On the other hand, after having crossed the tilt point, the cylinder 10 exerts on the mount 8 a pushing force tending to favor the movement between the opening and closure positions of the partition 1. The tilt point is located substantially at the middle of the stroke of the mount 8 between the opening and closure positions.

Thus, the mechanical assist device acts on the door 3 between the opening and closure positions of the partition 1 and is adapted to apply a braking force and a pushing force during successive respective phases of the movement of the door 3 between the opening and closure positions.

The gas cylinder 10 is arranged so as to apply a force on the mount 8 when the door 3 is in the closure or opening position. In addition, the partition 1 comprises vertical first stop 12a and second abutment 12b arranged respectively on either side of the door 3 on the sliding axis defined by the rail 9.

More specifically, the stops 12a and 12b are possibly identical, and are arranged respectively on either side of the opening 6, and at a distance from the opening 6 equivalent to the width 3b of the door 3.

In this manner, the vertical end 7a of the door 3 bears against the first stop 12a in the closure position and the end 7b of the door 3 bears against the second stop 12b in the opening position.

In addition, the use of a gas cylinder allows controlling the speed of extension of the door 3. Indeed, the cylinder is a low-power cylinder and allows controlling the speed of movement of the door 3 and damping the end-of-travel positions, for example to reduce the risk of pinching in the closure position.

Hence, the mechanical assist device is able to hold the door 3 in the opening and closing positions. Thus, the partition 1 remains in the open or closed position regardless of the flight incidence of the aircraft.

The mechanical assist device can be activated manually by the passenger via the handle 3d of the door 3.

More particularly, when the partition 1 is open, the door 3 is stowed into the compartment 4 of the fixed portion 2. The handle 3d being positioned on the end 7a of the door 3, it is accessible to the passenger. Hence, the passenger can pull on the door 3 in the direction of closure of the partition. The movement of the door 3 comprises two successive phases. During the first phase between the opening position and the tilt point, the passenger should pull on the door substantially firmly in the direction of closure to counter the braking force of the gas cylinder 10. During the second phase between the tilt point and the closure position, the user can release the door 3, the cylinder exerting a pushing force moving the door 3 until closure of the partition 1.

The deployment mechanism of the door 3 thus resting essentially on the actuator 10 in a bistable position, the device according to the invention is refined and allows gaining in lightweight by reduction in the number of necessary parts. In addition, the simplicity of the device allows gaining in compactness. Indeed, the partition 1 according to the invention can be used for a 34-inch short-pitch aircraft cabin while complying with the so-called Egress space standards necessary for evacuation.

In addition, the deployment mechanism is supported by simple, reliable and interchangeable mechanical members.

The partition 1 may be used in a seat arrangement in an aircraft cabin, for example to enable the separation of a business class seat from an aisle of the aircraft. Since the partition 1 can be used with a short pitch in the range of 34 inches, the partition can be used in a single-aisle aircraft.

Finally, the aircraft may be arranged so that the second stop 12*a* of a first seat arrangement is the first stop 12*b* of a second arrangement of a neighboring seat of the first arrangement, for example the arrangement of the front seat.

The invention claimed is:

1. A partition for an aircraft seat arrangement comprising a fixed portion and a sliding door movable between an opening position in which the door is stowed into a compartment formed in the fixed portion and a closure position in which the door comes out of the compartment, the partition comprising a mechanical assist device acting on the door between the opening and closure positions and able to hold the door in both the opening and closure positions, the assist device being adapted to apply a braking force and a pushing force during successive respective phases of the movement of the door between the opening and closure positions.

2. The partition according to claim 1, wherein the mechanical assist device is configured to be activated manually.

3. The partition according to claim 1, wherein the mechanical assist device comprises a sliding mount supporting the door and a bistable gas cylinder fastened at one end to the fixed portion and at an opposite end to the sliding mount.

4. The partition according to claim 3, wherein the sliding mount has a U-like profiled shape and is arranged at a first end of the door facing the fixed portion in the closure position of the partition.

5. The partition according to claim 4, comprising first and second vertical stops arranged on either side of the door so that the first end of the door bears against the first stop in the opening position and a second end of the opposite door bears against the second stop in the closure position.

6. The partition according to claim 3, wherein the cylinder is fastened to the fixed portion at a mid-point between the closure position and the opening position.

7. The partition according to claim 3, comprising a guide rail, the sliding door moving movable on the guide rail via a pad of the mount mounted on the rail.

8. An aircraft comprising a seat arrangement comprising a seat and a partition according to claim 1.

9. The aircraft according to claim 8, wherein the partition is arranged so that the door in the closure position isolates the seat from an aisle of the aircraft.

10. The aircraft according to claim 8, wherein the partition of the arrangement comprises first and second vertical stops arranged on either side of the door such that a first end of the door facing the fixed portion in the closure position of the partition bears against the first stop in the opening position and a second end of the opposite door bears against the second stop in the closure position, the aircraft comprising a second seat arrangement comprising the partition according to claim 7, the second stop of the first arrangement being the first stop of the second arrangement.

\* \* \* \* \*